U nited States Patent                                         [15] 3,670,793
Flesch                                                          [45] June 20, 1972

[54] WEIGHT CONTROLLED SLICING SYSTEM INCLUDING VARIABLE SYNCHRONIZATION CONTROL

[72] Inventor: Keith E. Flesch, Garrett, Ind.
[73] Assignee: Peter Eckrich & Sons, Inc.
[22] Filed: Dec. 14, 1970
[21] Appl. No.: 97,591

[52] U.S. Cl. ..........................................................146/94 R
[51] Int. Cl. .................................................................B26d 4/56
[58] Field of Search ............146/94 R, 94 C, 222, 110, 113 R

[56] References Cited

UNITED STATES PATENTS 3,379,234  4/1968  Kasper...............................146/94 R
3,508,591  4/1970  Johnson et al.....................146/94 R X Primary Examiner—Willie G. Abercrombie
Attorney—Hofgren, Wegner, Allen, Stellman & McCord

[57] ABSTRACT

A weight controlled slicing system for food products wherein the weight of a stack of slices cut from a length of material is accurately controlled. The system includes a knife with a variable speed drive including a speed control system, a slice receiver that receives slices as they are cut and an intermittently operable take-away conveyor for removing slices from the slice receiver after a predetermined number of slices are cut. Also included is a one-shot circuit responsive to the speed control system of the motor for progressively advancing the point at which the take-away conveyor is actuated as the speed of the motor increases to compensate for the fixed time required to actuate the take-away conveyor thereby enabling accurate retaring of a weigh cell associated with the slice receiver in readiness for the cutting of the next stack and precluding interference between the slices of one completely cut stack and the first slice of the next succeeding stack as it travels to the slice receiver.

6 Claims, 2 Drawing Figures

United States Patent
Flesch
[15] 3,670,793
[45] June 20, 1972
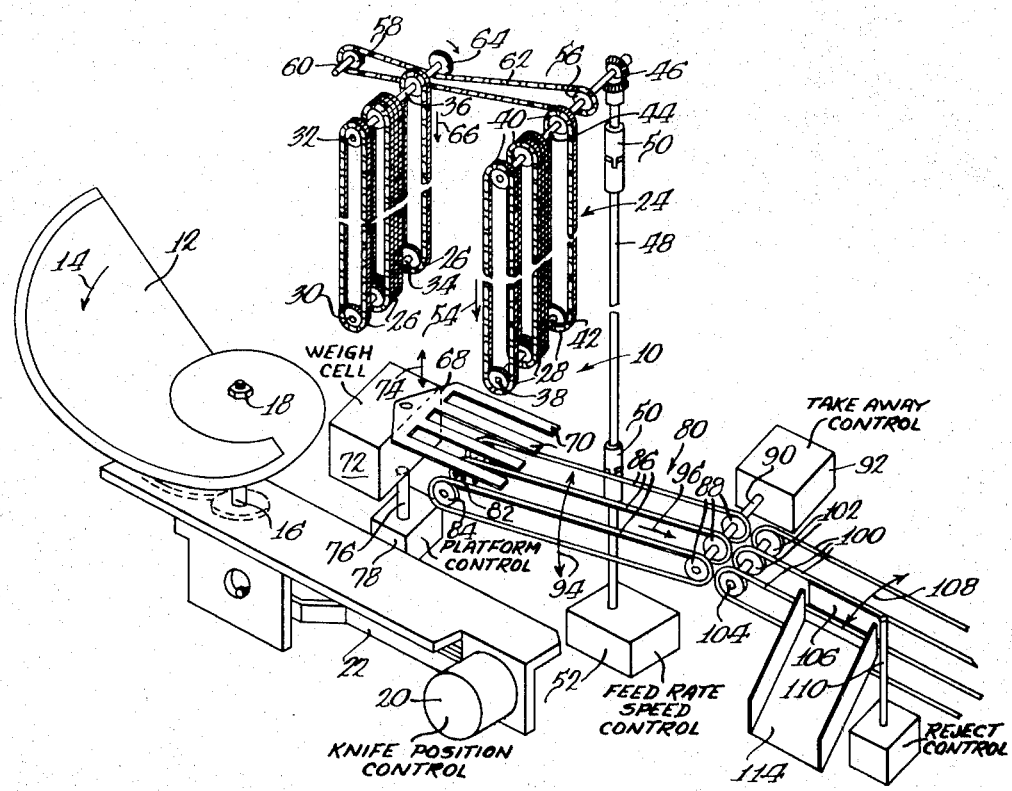

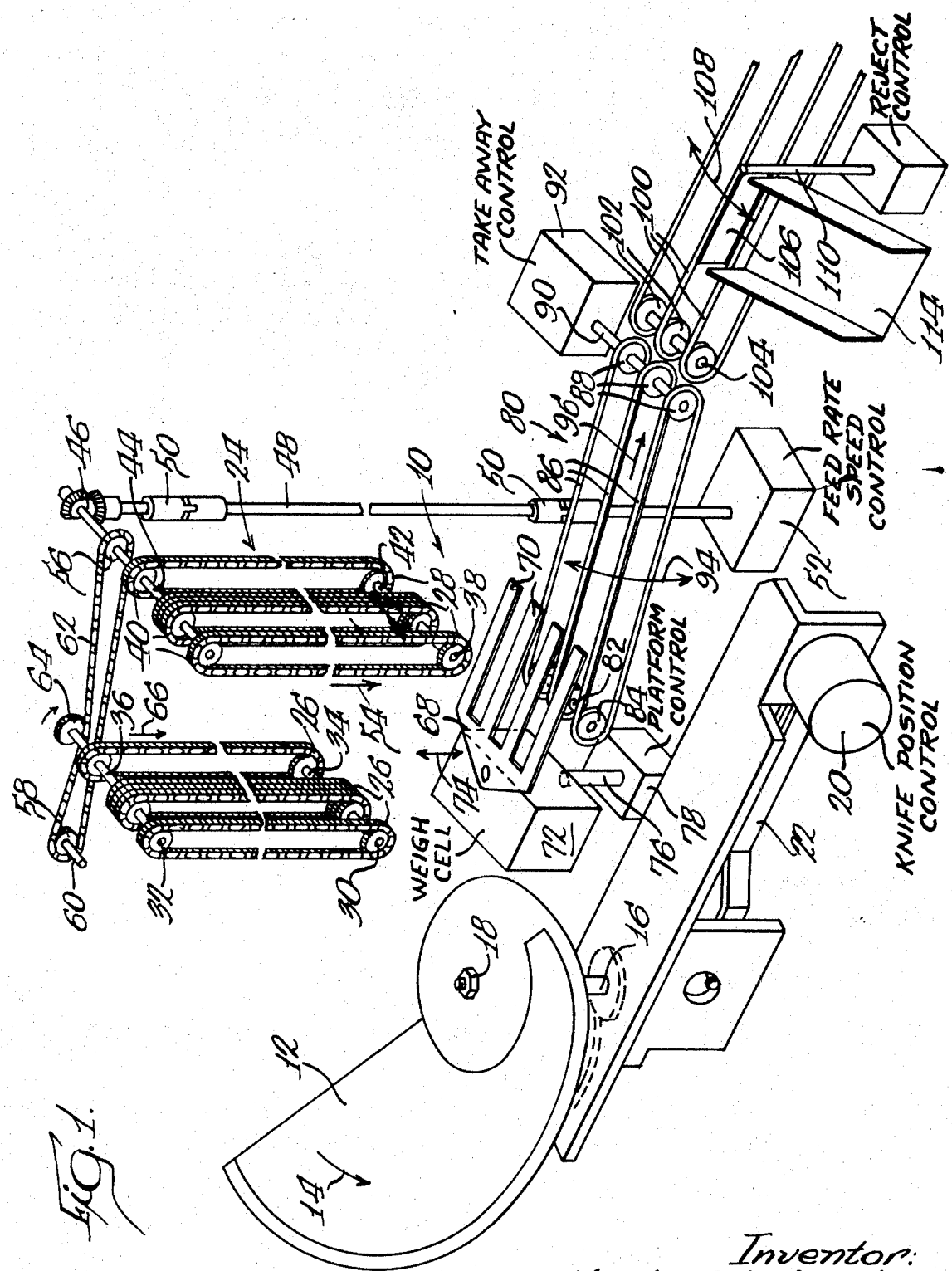

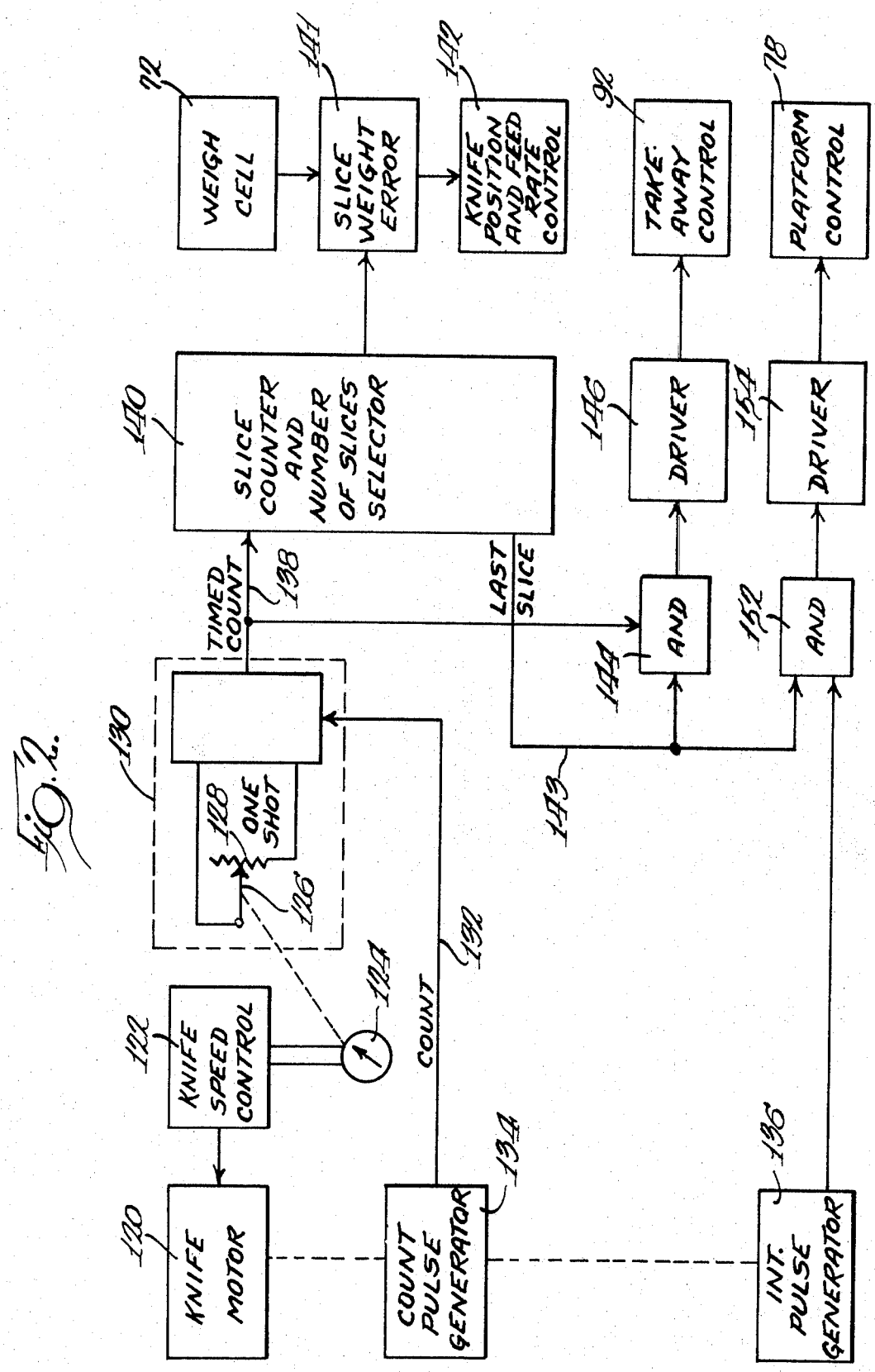

3,670,793

WEIGHT CONTROLLED SLICING SYSTEM INCLUDING VARIABLE SYNCHRONIZATION CONTROL

BACKGROUND OF THE INVENTION

Because of the relatively strict regulation of the food industry with respect to labeling practices, food producers have historically put more food in a container than stated on the label in order to insure that the great majority of containers will have at least the stated weight of food contained therein. The excess of food actually in the container over and above that stated to be contained therein is termed "give-away" in view of the fact that the consumer pays for a package having the stated weight of food contained therein but in reality will normally receive somewhat more food.

While the amount of "give-away" in a typical container is generally nominal in terms of the percentage of the stated weight, those skilled in the art are well aware of the fact that over a period of a year, the cost of such "give-away" to a given food producer will be substantial. Thus, every effort is made to minimize the amount of "give-away" and yet maintain a required percent of packages at a weight equal to or above the stated weight within the regulations of the appropriate governing body.

One area in which extensive effort has been expended to minimize "give-away" is in the marketing of multiple slice food packages containing such food stuffs as cheese and meat products such as sandwich meat. Most of the efforts have centered about the slicing operation and a typical weight controlled slicing system reduces "give-away" to an average of about 3 percent. Through use of one recently proposed system, the average "give-away" has been reduced to about 1 percent. This system is that disclosed in the commonly assigned, copending application of Lambert et al. entitled "Slicer Control System", Ser. No. 819,017, filed Apr. 24, 1969, now U.S. Pat. No. 3,605,837.

The Lambert et al. system is specifically designed for slicing loaf type products such as sandwich loaves and while extremely successful in accomplishing its intended purpose, the operation of the same may not be totally satisfactory when extremely high cutting rates are employed. In particularly, the Lambert et al. system employs a slice receiver which receives slices as they are cut by the knife and an intermittently operable take-away conveyor which removes a stack of slices from the slice receiver after a predetermined number of slices have been cut. Due to inherent limitations in the operation of the take-away conveyor, a finite, relatively constant time is required in energizing the same to take away a stack of slices from the slice receiver as each stack is completed. When extremely high cutting rates are employed, the time required in cutting each slice becomes extremely short and when the last slice in a stack is cut and the take-away conveyor actuated, if it is not actuated early enough in the slicing cycle for the last slice, it may not remove the stack of slices from the slice receiver sufficiently early to permit the first slice in the next stack to move unobstructed to the slice receiver. That is, the prior stack may interfere with movement of the first slice in the succeeding stack to the slice receiver.

Furthermore, in the Lambert et al. system, a weigh cell is associated with the slice receiver and the same must be retared after each stack is cut and before the first slice in the next stack is received by the slice receiver. If the take-away conveyor is not actuated sufficiently early for high cutting rates, there may be insufficient time to complete the retaring process. On the other hand, if the take-away conveyor is actuated sufficiently early to permit retaring for high slicing rates, for low slicing rates, the last slice in the stack may not have sufficiently settled on the stack to permit an orderly stack to be taken away.

SUMMARY OF THE INVENTION

It is the principal object of the invention to provide a new and improved weight control slicing system. More particularly, it is an object to provide a weight controlled slicing system wherein the operation of a take-away conveyor is automatically synchronized with the cutting rate.

The exemplary embodiment of the invention achieves the foregoing objects with the following construction. Means are provided to define a cutting zone into which a length of material to be sliced is fed. A rotatable knife is movable through the cutting zone to cut slices off the length of material as it is fed thereinto. The rotary knife is driven by a variable speed motor having a speed control system including a manual operator for setting a motor speed, and thus controlling the slicing rate. Just below the cutting zone there is provided a slice receiver in the form of a platform having a plurality of tines. Associated with the platform is a weigh cell for sensing the weight of the slices cut and received by the slice receiver and for initiating adjustments of both feed rate and knife position within the cutting area to accurately control the weight of the stack of slices to be cut to minimize "give-away".

A take-away conveyor is comprised of a plurality of belts that may be continuously driven and which are mounted on a frame so that the upper runs of the belts may be pivoted upwardly and between the tines of the platform to engage the underside of a stack of slices resting on the same and to convey the same away. Actuating means for causing the pivoting of the take-away conveyor to a stack engaging position are controlled by means which receive a signal each time a slice is cut and which is operative to move the take-away conveyor to a slice engaging position after a predetermined number of such signals have been received. Also provided is a means associated with the knife for generating the aforementioned signal each time a slice is cut.

Interposed between the signal generator and the signal receiver, and responsive to one of the speed control system and the motor speed, is a device which progressively advances the time in each cutting cycle at which the signal is received by the signal receiver as knife speed is increased.

In the exemplary embodiment, the last-mentioned means is formed by an electronic one-shot circuit including a variable resistor which is mechanically linked to the manual operator of the motor speed control so that the increasing or decreasing of the motor speed by manipulation of the manual actuator causes a change in the period of the one-shot. In the exemplary embodiment, the signal receiver is responsive to the trailing edge of the output pulse of the one-shot and the arrangement is such that as the manual actuator is adjusted to increase motor speed and thereby cause higher cutting rates, the period of the one-shot is progressively decreased to advance the point in the cutting cycle whereat the trailing edge of its output will be received by the signal receiver.

As mentioned previously, this construction insures that sufficient time will be permitted for retaring and removal of stacks from the slice receiver for high cutting rates and further insures that the last slice in a stack will fully settle on the stack before the take-away conveyor is actuated when low cutting rates are employed.

Other objects and advantages of the invention will become apparent from the following specification taken in conjunction with the accompanying drawings.

DESCRIPTION OF THE DRAWINGS

FIG. 1 is a mechanical schematic illustrating a weight controlled slicing system made according to the invention; and FIG. 2 is a block diagram of an electrical control system employed in the system.

DESCRIPTION OF THE PREFERRED EMBODIMENT

With reference to FIG. 1, an exemplary embodiment of the weight controlled slicing system made according to the invention is seen to include a cutting area, generally designated 10 through which a rotary knife 12 is moved in a direction indicated by an arrow 14. The knife 12 is mounted for rotation with a drive shaft 16 and retained thereon by means of a nut 18. By means of a knife position control motor 20 operating through a linkage 22, the vertical position of the shaft 16 may be controlled to control the position of the knife 12 within the cutting area 10.

Located above the cutting area 10 is a feeding means, generally designated 24, which is operative to drive a loaf or the like into the cutting area 10 to be cut by the knife 12 as the latter passes therethrough. The feeding means 24 consists of two sets of chains 26 and 28, respectively, which engage the loaf on opposite sides thereof to grip the same. The chains 26 are trained about a vertically spaced set of sprockets 30 and 32 with the sprockets 30 being mounted on an idler shaft 34 and the sprockets 32 being mounted on a driven shaft 36. Similar sets of sprockets 38 and 40 are associated with the chains 28 with the sprockets 38 being mounted on an idler shaft 42 and the sprockets 40 being mounted on a driven shaft 44. The driven shaft 44 is connected through a set of bevel gears 46 to a shaft 48 including couplings 50 to a feed rate speed control unit 52. The rotation of the shaft 48 is such that the same imparts rotation to the shaft 40 in a direction so that the run of the chains 28 facing the chains 26 is driven downwardly in the direction indicated by an arrow 54.

The shaft 40 also mounts a sprocket 56 which, in conjunction with a sprocket 58 mounted on an idler shaft 60 mount a drive chain 62 which passes under a sprocket 64 on the driven shaft 36. The sprockets 56 and 64 have the same pitch diameter and as a result, the shafts 36 will be rotated in a direction opposite the direction of rotation of shaft 44 so that the runs of the chains 26 facing the chains 28 will also be driven downwardly in the direction of an arrow 66 at the same speed as the facing runs of the chains 28 to provide a positive feed of a loaf interposed and gripped therebetween.

Below the cutting area 10 and positioned to receive slices cut from a loaf being fed by the feeding means 24, is a slice receiving platform 68 having a plurality of tines 70. The platform 68 is mounted on a conventional weigh cell 72 which in turn is mounted for up and down movement in a direction of an arrow 74 on a shaft 76 associated with a platform position control means 78. The platform position control means 78 is operative to progressively lower the platform 68 as a stack is being cut at a rate equal to the desired thickness of a slice per the amount of time required to cut a slice. For example, when the first slice in a stack is to be cut, the platform 68 will be at its uppermost position while when the seventh slice in a stack is to be cut, the upper surface of the sixth slice of the stack resting on the platform 68 will be approximately at the uppermost position of the platform 68.

The weigh cell 72 determines the weight of the number of slices resting on the platform 68 at any given time and provides an output signal having a magnitude proportional to the stack weight.

The system further includes a take-away conveying means, generally designated 80, including an idler shaft 82 mounting a plurality of sheaves 84 about which belts 86 are trained. The spacing between the sheaves 84 is such that the upper runs of the belts 86 can be moved between the tines 70 of the platform 68.

The belts 86 are also trained about sheaves 88 mounted on a driven shaft 90 operatively associated with a take-away control system 92. By means of a frame, not shown, the shaft 82 and the sheaves 84 thereon, and thus the upper runs of the belts 86, may be pivoted in the direction of an arrow 94 about the axis provided by the shaft 90 in such a way that the upper runs of the belts 86 pass through the tines 70 and above the upper surface of the platform 68 so as to engage slices resting on the latter. Further, by means of a motor (not shown) associated with the take-away control 92, rotary motion is imparted to shaft 90 in such a way as to drive the upper runs of the belts 86 in the direction of an arrow 96 to move the slices off of the platform 68 when the upper runs of the belts 86 engage the lowermost slice in the stack.

Thus far, the structure and system described is that shown in the above-identified Lambert et al. application, the disclosure of which is herein incorporated by reference; and reference may be had thereto for a more detailed statement of the structure comprising the various elements.

The mechanical structure is completed by a second set of conveying belts which have one end trained about respective sheaves 102 mounted on a shaft 104. By any suitable means, the upper runs of the belts 100 are driven in the same direction as the upper runs of the belts 86 so as to receive a stack of slices from the belts 86 and convey the same for further processing. According to one embodiment of the invention, there may be provided a reject control shown schematically as a paddle 106 mounted for movement in the direction of an arrow 108 by means of a shaft 110 operatively associated with a rejection control system 112. Also associated with the paddle 106 is a chute 114 or the like.

When it is desired to reject a stack of slices, the rejection control system 112 is actuated to rotate the shaft 110 in such a way as to locate the paddle 106 across the upper runs of the belts 100 so that a stack of slices will engage the same and be deflected thereby into the reject chute 114. Control of the reject control system 112 may be accomplished by means of a comparison of the actual slice weight as determined by the weigh cell with the predetermined standard, with operation of the reject control system 112 occurring when a predetermined deviation exists. The weigh cell used to provide such control can be the weigh cell 72 if the rejection mechanism is located sufficiently close to the cutting zone or if a memory is provided to remember the particular stack in a string of stacks running along the conveyors to be rejected. Alternatively, and more conventionally, a weigh cell separate from the weigh cell 72 may be associated with the conveying system to operate the reject control system 112.

Turning now to FIG. 2, the control system employed in the invention will be seen. In particular, there is provided a variable speed knife motor 120 which may be connected in any suitable manner to the shaft 16 to rotate the knife 12 in the direction of the arrow 14. Associated with the variable speed knife motor may be a conventional motor speed control system 122 having a manual actuator 124 for setting, at any desired rate, the rate of rotation of the knife 12. Mechanically linked to the manual actuator 124 is the wiper 126 of a potentiometer 128 forming the resistive portion of conventional RC circuit in a one-shot 130. As a result of the connection, the period of the one-shot 130 will be dependent upon the setting of the manual actuator 124 of the knife speed control 122. As will be seen, it is desired that the arrangement be such that the faster the speed setting for the motor 120 as determined by the position of the manual actuator 124, the shorter the period of the one-shot 130.

The one-shot 130 may be tripped by a count signal received on a line 132 from a count pulse generator 134 which may be constructed in the manner described in the above-identified Lambert et al. application and which is mechanically linked to the knife motor 120 in such a way as to generate the count signal at a predetermined point in each cutting cycle. While in the Lambert et al. system, a cutting cycle consists of two revolutions of the knife blade 12, the same need not be true herein. In fact, according to the invention, the linkage described by Lambert et al. for lowering the knife out of the cutting area every other revolution thereof may be eliminated so as to provide the cutting cycle for each revolution of the knife 12.

Also linked mechanically to the knife motor 120 in the manner described by Lambert et al. is an interrogate pulse generator 136 for purposes to be seen.

The output of the one-shot 130 is fed out on a line 138 to a slice counter and number of slices selector 140 which may be of the electromechanical construction described by Lambert et al., or preferably, of a wholly electronic construction. The construction of the slice counter and number of slices selector is such that the slice counter contained therein will be stepped one count on the trailing edge of each output signal of the one-shot 130 received by it on the line 138. It will therefore be appreciated that the stepping of the slice counter can occur at various times in the slicing cycle depending upon the setting of the manual actuator 124 for the knife speed control.

A commanded slice weight signal is fed from the slice counter and number of slices selector 140 to a slice weight error circuit 141 which additionally receives an actual stack weight signal from the weigh cell 72. The slice weight error circuit 141 compares the two signals and if a difference exists between the same a corrective or error signal is fed to a knife position and feed rate control 142 which is comprised of the knife position control 20 and the feed rate speed control 52.

The operation of the slice weight error circuit 141 in conjunction with the knife position and feed rate control circuit 142 is described in the above-identified Lambert et al. application. In general terms, the two operate in concert to adjust both the position of the knife 12 within the cutting area 10 and the feed rate of the loaf to be cut into the cutting area 10. Adjustment of the knife position effects an immediate, one cycle correction while the feed rate adjustment effects a long-range correction with the two operating in concert to minimize the error in stack weight to reduce "give-away" to no more than about 1 percent.

In operation, if the actual partial stack weight is under the desired partial stack weight for a particular number of slices, the knife 12 will be moved towards the feeding means 24 so that a thicker slice will be cut on the next cycle, the amount of such movement being governed by the magnitude of the error signal. On the other hand, if the actual partial stack weight is greater than the predetermined partial stack weight for that number of slices, the knife will be moved away from the cutting means so that a thinner slice will be cut on the next cycle to bring the actual partial stack weight into conformance with the desired standard partial stack weight. The feed rate speed control is similarly adjusted with the feed rate being increased if the partial stack is underweight and retarded if the partial stack is overweight.

The slice counter and number of slices selector 140 is constructed so that when the number of slices counted is equal to the number of slices selected, a last slice signal is issued on the line 143 to an AND gate 144. The precise construction by which such a signal may be generated is well known in the digital logic art and need not be described in detail herein.

The AND gate 144 is also connected to the output of the one-shot 130 at line 138 and includes an output to a driver 146 which in turn, when energized, energizes the take-away control 92 to elevate the belts 86 to a position wherein they will engage the stack of slices on the platform 68 and remove the same. The arrangement is such that the AND gate 144 will cause energization of the driver 146, and thus the take-away control 92, on the trailing edge of the output of the one-shot 130 and when the last slice signal is generated. Since the mechanical connection of the manual actuator 124 for the speed control through the one-shot 130 results in the trailing edge of the output pulse from the one-shot 130 being progressively advanced in the slicing cycle as knife speed is increased, for faster knife speeds, there will be earlier energization of the take-away control 92. The purpose of this construction is as follows. Basically, the time required for the take-away control 92 to elevate the belts 86 in the position shown in FIG. 1 to a point where they engage the underside of a stack of slices on the platform 68 is relatively constant, but the time required for each slicing cycle will be dependent upon the speed of the knife motor 120. Because of the fixed time required for elevation of the belts 86, for fast knife speeds, the stack of slices on the platform 68 may not be removed therefrom with sufficient speed to permit the weight cell 72 to be retared prior to the initiation of the cutting of the next stack in the manner mentioned in the Lambert et al. application or could even obstruct the movement of the first slice for the next stack cycle to the platform 68. Through the described system, faster knife speeds are inherently anticipated in such a way that following the take-away of the stack of slices, sufficient time will remain to permit retaring of the weigh cell 72 before the first slice of the next stack engages the platform 68.

The system is completed by an AND gate 152 receiving the output of the interrogate pulse generator as well as the last slice signal from the slice counter and number of slices selector 140 for operating a driver 154. The driver 154, when energized, operates the platform control 78 to raise the platform 68 to its uppermost position in the manner described by Lambert et al.

I claim:

1. In a slicing system including a knife for undergoing successive cutting cycles to cut slices from one end of a length of material fed into a cutting zone, a variable speed motor for driving the knife, a speed control system for the motor, a means for receiving slices cut from the length of material by the knife, an intermittently operable take-away conveying means for removing, at predetermined times, slices cut by the knife, and means operable after a predetermined number of cutting cycles have taken place for operating the take-away conveying means, the improvement which comprises: means responsive to said speed control system for varying the point in a slicing cycle when said operating means is operative.

2. A slicing system according to claim 1 wherein said receiving means comprises a platform having a plurality of tines; and said take-away conveying means comprises at least two spaced take-away belts, means for driving the belts, and means for positioning the belts between the tines to engage slices received on said platform whereby movement of the belts between the tines will remove the slices from the platform.

3. In a slicing system including a knife for undergoing successive cutting cycles to cut slices from one end of a length of food material fed into a cutting zone, a variable speed motor for driving the knife at varying speeds, a speed control system for the motor, a means for receiving slices cut from the length of food material by the knife, an intermittently operable take-away conveying means for removing slices cut by the knife from the slice receiving means, and means operable after a predetermined number of cutting cycles have taken place for operating the conveying means, the improvement which comprises: means responsive to said one of said speed control system and the speed of said motor for advancing the point in a slicing cycle at which said operating means may be operative as knife speed is increased.

4. In a weight controlled slicing system, the combination comprising: means defining a cutting area into which a length of material to be sliced may be fed; a knife mounted for rotary movement through said cutting area to cut a slice from one end of a length of material fed thereinto during each of a plurality of successive cutting cycles; a variable speed motor for rotating the knife; a speed control system for the motor; means adjacent said area for receiving slices cut from the length of material by the knife; intermittently operable take-away conveying means for removing slices from said receiving means; means for generating a signal each time a slice is cut; means for receiving said signal and operative after a predetermined number of signals have been received for actuating said take-away conveying means; and means interposed between said signal generating means and said signal receiving means and operatively associated with one of said speed control system and said motor for progressively advancing the point in each cutting cycle when said receiving means receives said signal as motor speed is increased.

5. The weight controlled slicing system of claim 4 wherein said last-named means comprises a one-shot having a variable period.

6. The weight controlled slicing system of claim 4 wherein said speed controlled system includes a manual operator, manipulateable to set the speed of said motor; and said advancing means comprises a one-shot circuit including a variable resistance, and a mechanical coupling between said variable resistance and said manual operator.

* * * * *